United States Patent
Ederer et al.

(10) Patent No.: US 12,171,237 B2
(45) Date of Patent: Dec. 24, 2024

(54) INSECT REPELLING COMPOSITIONS AND METHODS OF MANUFACTURE THEREOF

(71) Applicant: Accuro AgriServices, Inc., Riverview, FL (US)

(72) Inventors: G. Cord Ederer, Riverview, FL (US); Joseph B. Williams, McKinney, TX (US)

( * ) Notice: Subject to any disclaimer, the term of this patent is extended or adjusted under 35 U.S.C. 154(b) by 693 days.

(21) Appl. No.: 17/434,632

(22) PCT Filed: Feb. 27, 2020

(86) PCT No.: PCT/US2020/020013
§ 371 (c)(1),
(2) Date: Aug. 27, 2021

(87) PCT Pub. No.: WO2020/176697
PCT Pub. Date: Sep. 3, 2020

(65) Prior Publication Data
US 2022/0167631 A1    Jun. 2, 2022

Related U.S. Application Data

(60) Provisional application No. 62/811,270, filed on Feb. 27, 2019.

(51) Int. Cl.
| | |
|---|---|
| *A01N 65/44* | (2009.01) |
| *A01N 25/04* | (2006.01) |
| *A01N 35/04* | (2006.01) |
| *A01N 37/02* | (2006.01) |
| *A01N 43/16* | (2006.01) |
| *A01N 65/06* | (2009.01) |
| *A01N 65/28* | (2009.01) |
| *A01N 65/42* | (2009.01) |
| *A01P 17/00* | (2006.01) |

(52) U.S. Cl.
CPC ............. *A01N 65/44* (2013.01); *A01N 25/04* (2013.01); *A01N 35/04* (2013.01); *A01N 37/02* (2013.01); *A01N 43/16* (2013.01); *A01N 65/06* (2013.01); *A01N 65/28* (2013.01); *A01N 65/42* (2013.01); *A01P 17/00* (2021.08)

(58) Field of Classification Search
CPC ........ A01N 65/44; A01N 25/04; A01N 35/04; A01N 37/02; A01N 43/16; A01N 65/06; A01N 65/28; A01N 65/42; A01P 17/00
See application file for complete search history.

(56) References Cited

U.S. PATENT DOCUMENTS

| | | | |
|---|---|---|---|
| 7,780,873 B2 | 8/2010 | Mora-Gutierrez et al. | |
| 7,846,464 B2 | 12/2010 | Darling | |
| 8,771,718 B2 | 7/2014 | Scialdone et al. | |
| 10,111,835 B2 | 10/2018 | Agüeros Bazo et al. | |
| 2007/0166342 A1* | 7/2007 | Darling .................. | A01N 65/44 424/405 |
| 2007/0264297 A1 | 11/2007 | Scialdone et al. | |

FOREIGN PATENT DOCUMENTS

CN    106188336 A    12/2016

OTHER PUBLICATIONS

International Search Report and Written Opinion of the International Searching Authority dated Jun. 25, 2020, International Application No. PCT/US20/20013, 10 pgs.

International Preliminary Report on Patentability dated Aug. 25, 2021, International Application No. PCT/US20/20013, 7 pgs.

* cited by examiner

*Primary Examiner* — Trevor Love
(74) *Attorney, Agent, or Firm* — ArentFox Schiff LLP; Howard J. Susser; Marlo Schepper Grolnic

(57) ABSTRACT

Insect-repelling compositions comprise from about 0.001% to about 10% by weight of plant essential oils. The balance of the composition to 100% by weight includes deionized water, vanillin powder, isopropanol, glycerin, an emulsifier (such as polyglycerol oleate and/or sodium lauryl sulfate), and an aqueous chitosan formulation. The chitosan formulation comprises ≤8% volume of chitosan and ≤8% volume of acetic acid or vinegar.

12 Claims, No Drawings

INSECT REPELLING COMPOSITIONS AND METHODS OF MANUFACTURE THEREOF

CROSS-REFERENCE TO RELATED APPLICATIONS

This application is the U.S. national phase entry under 35 U.S.C. § 371 of International Application No. PCT/US2020/020013, filed Feb. 27, 2020, entitled INSECT REPELLING COMPOSITIONS AND METHODS OF MANUFACTURE THEREOF, which in turn claims priority to and benefit of U.S. Provisional Application No. 62/811,270, filed Feb. 27, 2019, the contents of which are incorporated herein by reference in their entirety for all purposes.

FIELD

The present disclosure relates generally to insect-repelling compositions and, more particularly, to liquid compositions suitable for application to human skin or other surfaces for repelling mosquitoes and other insects.

BACKGROUND

Bites from certain insects can cause skin irritation, infections and even disease to humans and other mammals. To protect humans from insect bites, various types of compounds have been developed. Some of these compounds, such as insecticides, are meant to kill or otherwise suppress reproduction of the insect. Other compounds, known as "repellents," debilitate the sensory organs of the insect without killing it. For example, female mosquitoes have acute receptors in the hairs on their antennae which are temperature- and moisture-sensitive and can detect human scents (e.g. carbon dioxide, body odor, secretions, lactic acid) up to 100 feet away. Mosquito repellent molecules and their antibacterial effects work together to confuse the mosquitos' olfactory receptors, thereby hampering recognition of a host by the mosquito. As such, the chances of a person being bitten are substantially reduced.

Because of its superior effects, many current insect repellents include the compound N,N-diethyl-m-toluamide, or "DEET." However, DEET has an unpleasant odor and is potentially harmful to humans. In fact, the use of DEET has been discouraged from application on children, pregnant women, nursing mothers and other sensitive members of the population. The United States and other countries have currently banned insect repellents containing DEET at certain concentrations from being manufactured for public use. Picaridin, 2-(2-hydroxyethyl)-1-piperidine carboxylic acid 1-methylpropyl ester, is another compound generally considered to be a safer alternative to DEET. However, in some cases, Picaridin can also cause irritation to a person's eyes, skin, or lungs. Furthermore, both DEET and Picaridin have high absorption rates into the skin. Insects have also begun to build up resistance to these chemicals, requiring additional applications to achieve the same level of effectiveness.

To solve the above problems, use of essential oils as a substitute for chemical mosquito repellents has been widely explored. Essential oils are natural insect repellents which plants produce to protect themselves from insects. Essential oils are complex mixtures of volatile organic compounds which are generally produced as secondary metabolites in plants and are responsible for their characteristic aroma. Metabolites such as α-pinene, cineole, eugenol, limonene, terpinolene, citronellol, citronellal, camphor and thymol are the common constituents in a number of essential oils, presenting mosquito repellent activity. Essential oils act at a vapor phase and are generally effective when freshly applied, as they usually dissipate quickly due to their high volatility. While this volatility supports insect repellency, it also makes it difficult for natural and organic insect repellents to be effective for more than 2-3 hours without reapplication. This requirement leaves a person vulnerable to insect bites if the repellent is not applied frequently enough.

SUMMARY

Described herein are compositions for repelling mosquitos and other insects which combine multiple essential oils which have known insect-repelling components with a fixative to reduce volatility and to provide a sustained release of the essential oil. The compositions furthermore have a pleasant odor and are free from both DEET and Picaridin. Although some of the compounds described herein have been used separately as insect repellents, they have not before been combined with the select ingredients of the present disclosure or manufactured in the disclosed manner to achieve a surprisingly long-lasting and effective insect repellent.

The insect-repelling compositions described herein comprise from about 0.001% to about 10% by weight of plant essential oils. The balance of the composition to 100% by weight includes deionized water, vanillin powder, isopropanol, glycerin, an emulsifier (for example, polyglycerol oleate and/or sodium lauryl sulfate), and an aqueous chitosan formulation. The compositions can be incorporated into a liquid, lotion or any other suitable product to be applied to a surface to repel mosquitos. Advantageously, the compositions of this disclosure have been demonstrated to retain full effectiveness for up to eight hours without reapplication, are environmentally safe, are DEET- and Picaridin-free, and can easily be applied to human skin with no known adverse effects.

Further examples of the insect-repelling compositions of this disclosure may include one or more of the following, in any suitable combination.

In examples, the insect-repelling compositions of this disclosure include an aqueous solution of essential oils, vanillin and a chitosan formulation. The essential oils may be selected from the group consisting of essentials oils of citronella, cedar, lemongrass, garlic, clove, and lemon eucalyptus. In examples, the composition is made up of about 5% weight of essential oil of citronella or lemon eucalyptus, and mixtures thereof, about 1.2% weight of essential oil of lemongrass; about 0.7% weight of essential oil of cedar; about 0.7% weight of castor oil; about 0.003% weight of essential oil of garlic; and about 0.035% of essential oil of clove. In examples, the composition is made up of about 10% weight of the essential oils. In examples, the composition includes >2% volume of the chitosan formulation. In examples, the chitosan formulation is an aqueous formulation made up of ≤8% volume of chitosan and ≤8% volume acetic acid or vinegar. In examples, the composition further includes an emulsifier which may be polyglycerol oleate, sodium lauryl sulfate, or a combination thereof. In examples, the composition further includes isopropyl alcohol and/or castor oil. In examples, the vanillin is powdered vanillin. In examples, when applied to human skin, the composition provides ≥88% landing and ≥97% probing repellency of yellow fever mosquitos within 15 minutes of application for up to eight hours without reapplication to the skin.

Examples of a method of manufacturing an insect-repelling composition of this disclosure include: forming an essential oil and water emulsion; forming a chitosan formulation; and combining the essential oil and water emulsion with the chitosan formulation. In examples, forming the essential oil and water emulsion includes: adding a preselected amount of deionized water to a container; adding preselected amounts of isopropanol and glycerin to the amount of deionized water and combining; adding preselected amounts of essential oils to the amount of deionized water to form a deionized water and oil solution; adding a preselected amount of an emulsifier to the deionized water and oil solution while mixing; and adding a preselected amount of vanillin to the deionized water and oil solution while mixing. In examples, the method further includes continuously mixing the essential oil and water emulsion with the chitosan formulation to formulate a stable emulsion for a first period of time; and allowing the stable emulsion to rest for a second period of time. In examples, the first period of time is at least one hour and the second period of time is at least 15 minutes. In examples, the essential oils are selected from the group consisting of essentials oils of citronella, cedar, lemongrass, garlic, clove, and lemon eucalyptus. In examples, adding the preselected amount of vanillin to the deionized water and oil solution includes sieving a preselected amount of vanillin powder into the deionized water and oil solution at a rate no greater than 0.1 g/sec. In examples, the emulsifier is polyglycerol oleate or sodium lauryl sulfate, or a combination thereof.

Examples of an insect-repelling composition of this disclosure also include an insect-repelling composition formed by the methods described above.

These and other features and advantages will be apparent from a reading of the following detailed description. It is to be understood that both the foregoing general description and the following detailed description are explanatory only and are not restrictive of aspects of the disclosure as claimed.

DETAILED DESCRIPTION

As used in the specification and claims, for the purposes of describing and defining the disclosure, the terms "about" and "substantially" are used to represent the inherent degree of uncertainty that may be attributed to any quantitative comparison, value, measurement, or other representation. The terms "about" and "substantially" are also used herein to represent the degree by which a quantitative representation may vary from a stated reference without resulting in a change in the basic function of the subject matter at issue. "Comprise," "include," and/or plural forms of each are open ended and include the listed parts and can include additional parts that are not listed. "And/or" is open-ended and includes one or more of the listed parts and combinations of the listed parts.

As used herein, an "insect-repelling composition" is a formula that repels insects or other pest arthropods and that can be applied to skin or another surface.

As used herein, an "essential oil" is any concentrated, hydrophobic liquid with volatile aroma compounds derived from plants. Essential oils can be extracted from their respective plants by steam distillation, cold pressing, or $CO_2$ extraction.

Although the repellent activity of the essential oils of this disclosure are generally attributed to their particular compounds, without intending to be bound by any theory of operation, the present disclosure relates to the synergistic effects of the components found in the combination of these oils, as well as the addition of vanillin as a fixative (stabilizer), and a chitosan formulation as a bonding agent as well as an antibacterial and antifungal solution. While the essential oils of the compositions of this disclosure are known in the art to provide a certain amount of mosquito repellency, none of the essential oils have been combined as disclosed in the examples of the present disclosure. The insect-repelling compositions may be topically applied and used in manufacturing products with insect-repelling capability. The insect-repelling compositions described herein are believed to be effective in repelling mosquitoes, biting flies, gnats, no-see-ums (biting midges), and house flies, among other insects, from the coated area.

The active ingredients used in the insect-repelling compositions described herein comprise combinations of essential oils of citronella and/or lemon eucalyptus, lemongrass, cedar, clove and garlic, together with castor oil (a non-essential oil). The active ingredients are described in more detail in Table I.

TABLE 1

Essential Oil botanic information including: species, family, extraction methods, major chemical components

| Essential Oils | Species | Family | Origin | Part | Method | Major components |
|---|---|---|---|---|---|---|
| Cedar | *Jumperus Virginiana* | Pinaceae (Cupressaceae) | US | wood | steam distilled | β-phellandrene α-pinene β-pinene α-Terpineol |
| Citronella | *Cymbopogon winterianus, nardius* | Poaceae | India | leaf | steam distilled | citronellal geraniol citronellol Limonene |
| Clove | *Syzygium aromaticum* (L.) | Myrtaceae | India | flower bud | steam distilled | eugenol caryophyllene eugenyl acetate |
| Garlic | *Allium sativum* L. | Amaryllidaceae | China | bulb | steam distilled | diallyl disulfide, diallyl trisulfide, methyl allyl trisulfide |
| *Leman eucalyptus | *Eucalyptus citriodora* Hook. | Myrtaceae | Brazil | leaf, twig | steam distilled | citronellal geraniol β-citronellol δ-cadinene |

TABLE 1-continued

Essential Oil botanic information including: species, family, extraction methods, major chemical components

| Essential Oils | Species | Family | Origin | Part | Method | Major components |
|---|---|---|---|---|---|---|
| Lemongrass | *Cymbopogon flexuosus* | Poaceae | India | leaf | steam distilled | 75-85% -Citral is an isomeric mixture of geranial (citral a) and neral (citral b) |
| **Castor | *Ricinus communis* L. | Euphorbiaceae | India | seed | pressed | ricinolic, linoleic, oleic acids |

Note:
chemical components in bold text have proven mosquito repellent and deterrent properties according to literature in [Table 2].
*Lemon Eucalyptus can be used as a substitute for Citronella
**Castor oil is a Glyceridic Oil (Not an essential oil)

The insect-repelling metabolites contained in the essential oils of the active ingredients are furthermore described in Table 2.

TABLE 2

Mosquito repellency or deterrency effects of individual major chemical

| EO component | Repellency | Mosquito |
|---|---|---|
| Citronellal | feeding deterrent/repellent, spatial repellent/inhibitor, contact repellent/deterrent | female *An. gambiae* |
| Citronellol | repellent component | female *An. gambiae* |
|  | feeding deterrent/repellent, spatial repellent/inhibitor | female *An. gambiae* |
| Eugenol | high repellency | female *Cx. pipiens pallens* |
| Geranial | at 0.2 mg · cm$^{-2}$, blood-sucking by mosquitoes reduced by 10, 15, and 18% after 1, 2 and 3 h, respectively | *Cx. pipiens pallens, Cx. pipiens quinquefasciatus* |
| Geraniol | spatial repellent: 0.25 µg · cm$^{-2}$ ca. 100% (reversible) inhibition of host-seeking after 48 h exposure | female *Ae. albopictus* |
| Limonene | 1 h, 1.92 µg · cm$^{-2}$ = 70$^{\dagger}$, 70$^{\ddagger}$% repellency | *Ae. aegypti, Ae. albopictus* |
| Linalool | $^a$1.4 mg (±)-linalool · cm$^{-2}$ = 67% repellency | female *Ae. aegypti* |
| Oleic acid | 0.4 mg · cm$^{-2}$ = 52% repellency after 1 h$^a$ | female *Ae. aegypti* |
| α-Pinene | d-α-pinene , 2 h protection | Mosquito |
| α-Terpinene | 1 h, 1.92 µg cm$^2$ = 68$^{\dagger}$, 55$^{\ddagger}$% repellency $^a$1.4 mg · cm$^{-2}$ = 15% repellency | *Ae. aegypti, Ae. albopictus* female *Ae. aegypti* |
| γ-Terpinene | 1 h, 1.92 µg · cm$^{-2}$ = 60$^{\dagger}$, 72$^{\ddagger}$% repellency | *Ae. aegypti, Ae. albopictus* |
| Terpinen-4-ol | 1 h, 1.92 µg · cm$^{-2}$ = 92$^{\dagger}$, 85$^{\ddagger}$% repellency $^a$1.4 mg · cm$^{-2}$ = 83% repellency | *Ae. aegypti, Ae. albopictus Ae. aegypti* |

$^{\dagger}$DEET = 50% repellency.
$^{\ddagger}$DEET = 60% repellency.
$^a$Human-bait assay.

The active ingredients of the insect-repelling compositions described herein can total up to 25% of the final composition by weight. Preferably, active ingredients of the insect-repelling compositions described herein total up to 10% of the final composition by weight. In examples, percentages by weight of the active ingredients in the insect-repelling compositions of this disclosure are shown in Table 3:

TABLE 3

PERCENTAGE BY WEIGHT OF ACTIVE INGREDIENTS

| Materials | % of Material |
|---|---|
| Citronella | 1-25% |
| Lemongrass | 1-10% |
| Cedar (Virginia) | 0-8% |
| Castor | 0-8% |
| Garlic | 0-5% |
| Clove Bud Redistilled | 0-5% |

If Lemon Eucalyptus replaces Citronella use the same %

Preferably, the composition comprises about 5% weight of essential oil of citronella or lemon eucalyptus; about 1.2% weight of essential oil of lemongrass; about 0.7% weight of essential oil of cedar; about 0.7% weight of castor oil; about 0.003% weight of essential oil of garlic; and about 0.035% of essential oil of clove The balance of the insect-repelling composition comprises inert ingredients, which can preferably total up to 90% of the composition by weight. The inert ingredients of the compositions of this disclosure can include deionized water, vanillin, isopropanol, glycerin, an emulsifier (e.g., polyglycerol oleate or sodium lauryl sulfate, or a combination of the two) and a chitosan formulation, described in more detail below. In examples, percentages by weight of the inert ingredients in the insect-repelling compositions of this disclosure are shown in Table 4:

TABLE 4

PERCENTAGE BY WEIGHT OF INERT INGREDIENTS

| Materials | % of Inert ingredients |
| --- | --- |
| Chitosan | 3.000%-6.000% |
| Acidic Acid | 1.500%-3.000% |
| deionized water | 95.50%-91.00% |

As used herein, "deionized water" is water that has been subjected to a mineral-stripping process. Isopropanol is a compound with the chemical formula $C_3H_8O$ and has antibacterial properties. Glycerine (or glycerol) is a simple polyol compound with the composition $C_3H_8O_3$. Glycerine is widely used in pharmaceutical formulations for lotions and moisturizers. Polyglycerol oleate (or polyglyceryl-4 oleate) (PGO) is a distilled triglycerol ester based on vegetable oleic acid and is commonly used as an emulsifier. Sodium lauryl sulfate (SLS) is an anionic surfactant naturally derived from coconut and/or palm kernel oil.

Examples of vanillin, as used in the insect-repelling compositions of this disclosure, include a powder of vanillin (4-Hydroxy-3-methoxybenzaldehyde). Vanillin is the primary component of the extract of the vanilla bean, and can be naturally-derived or synthetic. In the disclosed compositions, vanillin is used as a fixative to slow the release of the volatile components.

Chitosan is a linear polysaccharide composed of randomly distributed β-linked D-glucosamine and N-acetyl-D-glucosamine. Chitosan is generally made by treating the chitin shells of shrimp and other crustaceans with an alkaline substance. In the disclosed compositions, chitosan and its emulsified components allow the oil and water emulsion droplets of the compositions to adhere to a negatively charged surface, like hair. Chitosan has also been shown to have antibacterial properties that could support the reduction of odor due to bacteria.

A preferred method for preparing the insect-repelling compositions of this disclosure will now be described. The method generally includes a three-step process for formulation using vinegar or acetic acid ($CH_3COOH$) as a pH adjuster. The first step is to create a completely emulsified aqueous essential oil formulation. The second step is to create an aqueous chitosan formulation comprising ≤8% volume of chitosan and ≤8% volume of acetic acid or vinegar. The final step is the combination of the essential oil formulation and the chitosan formulation to produce the long-lasting and effective insect-repelling compositions of this disclosure.

The steps of the method will now be described in more detail. In examples, the steps of the method are performed using an appropriately-sized industrial tank with a commercial mixer.

Step 1: Blending of the Essential Oil Formulation.
    Determine batch size.
    Add all required deionized water to the tank and record water temperature.
    Water temperature must be at least 88° F. to ensure a complete dissolution of all materials.
    Start the mixer.
    Weigh each ingredient prior to including it into the mixer.
    Record initial pH of water
    Add glycerin and isopropanol. Record pH.
    Add oils and record pH.
    Add emulsifier and record pH.
    Sieve vanillin powder slowly at a rate no greater than 0.1 g/sec per gallon of formulation Step 2: Blending of the Chitosan Formulation
    Determine batch size.
    Add all required deionized water to the tank and record pH.
    Add vinegar (or acetic acid) to adjust pH down to <4.9.
    Add chitosan and record pH. Continually watch pH level while adding chitosan.
    Final pH should be <4.9

Step 3: Blending Essential Oil Formulation and Chistosan Formulation
    Add the chitosan formulation to the essential oil formulation
    Mix for one (1) hour minimum after all ingredients are added. Record final pH and batch temperature.
    When finished mixing, wait 15 minutes.
    Transfer final composition to container.

EXAMPLE

The following example is presented to illustrate the disclosure without limitation. Unless otherwise described, percentages constitute proportion by weight of the total composition.

A controlled study was conducted to measure the repellency associated with the insect-repelling compositions of this disclosure (the "Accuro Mosquito Repellent") against yellow fever mosquitoes (*Aedes aegypti*). The methodology, results and conclusions are set forth below.

TABLE 5

TEST SUBSTANCE INFORMATION

| # | Test Substance | Active Ingredients | EPA Reg. No. and/or Est. No. | Lot and/or Batch # | Snell Receipt Code |
| --- | --- | --- | --- | --- | --- |
| 1 | Control-Untreated | NA | N/A | NA | N/A |
| 2 | Mosquito Repellent | N/A | N/A | NA | 112417-1-A-ACC |

TABLE 6

TEST SYSTEM INFORMATION

| Trial | Test System | Strain | Stage/Age | Source |
| --- | --- | --- | --- | --- |
| AEDSAE | Yellow Fever Mosquito (*Aedes aegypti*) | Lab | Adults Females | Purchased/Lab Reared |

TABLE 7

TEST DESIGN (per aged evaluation)

| # Reps per Substance | # Systems per Rep | # Systems per Substance |
|---|---|---|
| 2-Controls, 4-Test Substance | 25 | 50-Controls, 100-Test Substance |

Materials and Methods:

Test Surfaces:
1. Collagen membranes were used as a skin analog for testing the test substance.

Application Equipment:
2. The test substance was applied using a commercial trigger sprayer.

Test Substance Preparation and Applications:
3. The collagen membranes were moistened with water and the surface was dried prior to the applications to provide a texture and consistency that was similar to human skin.
4. The applications were conducted to the collagen membranes by shaking the test substance well, then spraying the test substance onto the membranes until wet (two trigger pulls) and then gently rubbing the test substance into the membranes.
5. The membranes selected for the untreated controls were moistened with water but did not receive any other application.
6. The membranes were placed on top of water moistened paper towels (lightly moistened) to maintain a "skin like" consistency by preventing complete moisture loss from the membranes while aging. The membranes were placed on the paper towels with the untreated side in contact with the paper towels and water was added to the paper towels as needed to maintain moisture during the aging process.

Aged Evaluations:
7. The controls and test substance were evaluated at 15 minutes, 2 hours, 4 hours, 6 hours, and 8 hours after the applications. Each control evaluation consisted of two replicates per age and each treatment evaluation consisted of four replicates per age.

Test Design:
8. Twenty-five (25) female mosquitoes were released inside a 1'×1' cage and the mosquitoes were held without food for at least two hours prior to testing.
9. The cage had a 1'×1' wooden cover on the top of the cage with an approximate 2.5"×6" removable section in its center. The section was removable to provide an opening in the top of the cage for the test surface and for the mosquitoes to try to feed on the test subject's arm above the test surface. Mesh was placed on the top side of the test surface to prevent direct contact of the test surface with the test subject's arm and disposable wood spacers were placed on top of the top cover to elevate the test subject's arm from the test substance and to prevent the mosquitoes from being able to feed on the test subject.
10. An untreated pre-treatment evaluation was conducted prior to testing the treated test surface by counting the number of mosquitoes that landed and probed on an untreated test surface during a 5-minute time period. Only cages that had pre-treatment activity of at least three probes were used for testing the treated surface.
11. The treated surface was evaluated in the same manner as the untreated surface and the repellency was calculated by comparing the number of landing and probes during the pre-treatment evaluation to the number of landing and probes during the treatment evaluation.
12. The study was conducted using two different test subjects for each population (control and treatment) and aged evaluation.

Results/Discussion:

The results of this study are shown in Tables 8 and 9. Table 8 shows the average number of yellow fever mosquito landings and probes that occurred during the pre-treatment and treatment evaluations for each aged evaluation. The results in Table 9 show the percent repellency of the yellow fever mosquitoes, which was calculated by comparing the average number of mosquito landings and probes during the post-treatment evaluation to the average number of landing and probes that occurred during the pre-treatment control evaluation (1−(treatment avg./pre-treatment avg.)).

The insect-repelling composition of this disclosure provided high mosquito repellency during the study. The insect-repelling composition recorded ≥88% landing and ≥97% probing repellency during all aged evaluations. The untreated control population recorded increases in landing and probing activity during all aged evaluations.

TABLE 8

AVERAGE NUMBER OF MOSQUITO LANDINGS AND PROBES
Yellow Fever Mosquitoes (*Aedes aegypti*)
Average Number of Landings & Probes

| | | Pre-treatment Activity | | Treatment Activity | |
|---|---|---|---|---|---|
| Aged Evaluation | Test Substance: | Landings | Probes | Landings | Probes |
| 15 Min | Controls-Untreated | 16 | 13 | 20 | 16 |
| | Accuro Mosquto Repellent | 15 | 13 | 0 | 0 |
| 2 hr | Controls-Untreated | 15 | 12 | 20 | 16 |
| | Accuro Mosquto Repellent | 11 | 9 | 1 | 0 |
| 4 hr | Controls-Untreated | 8 | 7 | 14 | 11 |
| | Accuro Mosquto Repellent | 16 | 14 | 0 | 0 |
| 6 hr | Controls-Untreated | 14 | 12 | 16 | 13 |
| | Accuro Mosquto Repellent | 12 | 9 | 1 | 0 |
| 8 hr | Controls-Untreated | 9 | 8 | 12 | 1 |
| | Accuro Mosquto Repellent | 13 | 11 | 1 | 0 |

TABLE 9

PERCENT REPELLENCY OF MOSQUITOES
Yellow Fever Mosquitoes (*Aedes aegypti*)
Percent Repellency of Landings & Probes
Based on Pre-Treatment Activity
(negative numbers represent an increase in activity)

| Aged Evaluation | Test Substance: | Landings | Probes |
|---|---|---|---|
| 15 Min | Controls-Untreated | −22% | −19% |
|  | Accuro Mosquito Repellent | 98% | 100% |
| 2 hr | Controls-Untreated | −38% | −39% |
|  | Accuro Mosquito Repellent | 88% | 100% |
| 4 hr | Controls-Untreated | −75% | −50% |
|  | Accuro Mosquito Repellent | 98% | 100% |
| 6 hr | Controls-Untreated | −11% | −9% |
|  | Accuro Mosquito Repellent | 91% | 97% |
| 8 hr | Controls-Untreated | −33% | −38% |
|  | Accuro Mosquito Repellent | 92% | 100% |

CONCLUSION

The results of the study indicate that the insect-repelling composition of this disclosure provides high repellency against yellow fever mosquitoes within 15 minutes after applying and lasting for up to eight hours after the initial application without reapplying.

While the disclosure has been particularly shown and described with references to preferred examples thereof, it will be understood by those skilled in the art that various changes in form and details may be made therein without departing from the spirit and scope of the disclosed application as defined by the appended claims. Such variations are intended to be covered by the scope of this disclosed application. As such, the foregoing description of examples of the disclosed application is not intended to be limiting, the full scope rather being conveyed by the appended claims.

The invention claimed is:

1. An insect-repelling composition comprising an aqueous solution of essential oils, vanillin and a chitosan formulation,
    wherein the composition comprises about 5% weight of essential oil of citronella or lemon eucalyptus; about 1.2% weight of essential oil of lemongrass; about 0.7% weight of essential oil of cedar; about 0.7% weight of castor oil; about 0.003% weight of essential oil of garlic; about 0.035% of essential oil of clove, and an emulsifier selected from the group consisting of polyglycerol oleate, sodium lauryl sulfate, or a combination thereof.

2. The composition of claim 1, wherein the composition comprises >2% volume of the chitosan formulation.

3. The composition of claim 1, wherein the chitosan formulation is an aqueous formulation comprising ≤8% volume of chitosan and ≤8% volume acetic acid or vinegar.

4. The composition of claim 1, further comprising isopropyl alcohol.

5. The composition of claim 1, wherein the vanillin is powdered vanillin.

6. The composition of claim 1, wherein, when applied to human skin, the composition provides ≥88% landing and ≥97% probing repellency of yellow fever mosquitos within 15 minutes of application for up to eight hours without reapplication to the skin.

7. A method of manufacturing an insect-repelling composition comprising: forming an essential oil and water emulsion; forming a chitosan formulation; and combining the essential oil and water emulsion with the chitosan formulation,
    wherein the composition comprises about 5% weight of essential oil of citronella or lemon eucalyptus; about 1.2% weight of essential oil of lemongrass; about 0.7% weight of essential oil of cedar; about 0.7% weight of castor oil; about 0.003% weight of essential oil of garlic; about 0.035% of essential oil of clove, and an emulsifier selected from the group consisting of polyglycerol oleate, sodium lauryl sulfate, or a combination thereof.

8. The method of claim 7, wherein said forming the essential oil and water emulsion comprises:
    adding a preselected amount of deionized water to a container;
    adding preselected amounts of isopropanol and glycerin to the amount of deionized water and combining;
    adding preselected amounts of essential oils to the amount of deionized water to form a deionized water and oil solution;
    adding a preselected amount of an emulsifier to the deionized water and oil solution while mixing; and
    adding a preselected amount of vanillin to the deionized water and oil solution while mixing.

9. The method of claim 7, further comprising:
    continuously mixing the essential oil and water emulsion with the chitosan formulation to formulate a stable emulsion for a first period of time; and
    allowing the stable emulsion to rest for a second period of time.

10. The method of claim 9, wherein the first period of time is at least one hour.

11. The method of claim 9, wherein the second period of time is at least 15 minutes.

12. The method of claim 7, wherein said adding the preselected amount of vanillin to the deionized water and oil solution comprises sieving a preselected amount of vanillin powder into the deionized water and oil solution at a rate no greater than 0.1 g/sec.

* * * * *